(12) United States Patent
Lenke et al.

(10) Patent No.: US 10,776,073 B2
(45) Date of Patent: Sep. 15, 2020

(54) SYSTEM AND METHOD FOR MANAGING A MUTE BUTTON SETTING FOR A CONFERENCE CALL

(71) Applicant: NUANCE COMMUNICATIONS, INC., Burlington, MA (US)

(72) Inventors: Nils Lenke, Rheinbach (DE); Eric Montague, Brussels (BE); William F. Ganong, III, Brookline, MA (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 0 days.

(21) Appl. No.: 16/154,439

(22) Filed: Oct. 8, 2018

(65) Prior Publication Data

US 2020/0110572 A1    Apr. 9, 2020

(51) Int. Cl.
*H04N 7/15*       (2006.01)
*G06K 9/00*       (2006.01)
*G06F 3/16*       (2006.01)
*G06F 3/01*       (2006.01)
*G10L 21/0208*    (2013.01)
*G06T 7/20*       (2017.01)

(52) U.S. Cl.
CPC .............. *G06F 3/165* (2013.01); *G06F 3/013* (2013.01); *G06F 3/167* (2013.01); *G06K 9/00221* (2013.01); *G06T 7/20* (2013.01); *G10L 21/0208* (2013.01); *H04N 7/15* (2013.01)

(58) Field of Classification Search
CPC ...... H04M 3/568; G10L 15/083; G10L 15/22; G10L 25/78; G10L 21/0208; G08B 21/18; G06F 17/30976; G06F 3/165; G06F 3/013; H04N 7/15; G06K 9/0021; G06K 9/00335; H04L 41/0681; H04L 65/4038; H04L 43/16
USPC .............. 381/107, 91, 92, 94.1, 110, 56, 57; 379/88.02
See application file for complete search history.

(56) References Cited

U.S. PATENT DOCUMENTS

| 5,680,481 | A  | 10/1997 | Prasad et al. |
| 5,774,591 | A  | 6/1998  | Black et al.  |
| 7,246,058 | B2 | 7/2007  | Burnett et al.|
| 7,343,289 | B2 | 3/2008  | Cutler et al. |
| 7,362,350 | B2 | 4/2008  | Cutler et al. |

(Continued)

OTHER PUBLICATIONS

R. Cutler et al., "Look who's talking: Speaker detection using video and audio correlation", IEEE International Conference on Multimedia and Expo, 2000, 1589-1592.

*Primary Examiner* — Vivian C Chin
*Assistant Examiner* — Ubachukwu A Odunukwe (57) ABSTRACT

A system, method and computer-readable storage device are disclosed for managing a mute and unmute feature on a device which is used to communicate data in a communication conference. The method includes detecting, when the device is set to mute, whether the user is speaking and whether the speech is meant for the conference. Background noises are distinguished from the speech of the user. If the user is speaking and the device is set to mute, the device will automatically switch to and unmute setting such that people in the indication conference can hear the user speak. Facial recognition, and gaze detection or other data can also be used to determine when to automatically mute or unmute the device and can aid in inferring an intent of the user to speak to the conference participants.

17 Claims, 6 Drawing Sheets

(56) References Cited

U.S. PATENT DOCUMENTS

| | | |
|---|---|---|
| 7,369,951 B2 | 5/2008 | Blosser et al. |
| 7,433,484 B2 | 10/2008 | Asseily et al. |
| 7,577,522 B2 | 8/2009 | Rosenberg et al. |
| 7,627,139 B2 | 12/2009 | Marks |
| 8,194,829 B1 | 6/2012 | Das |
| 8,264,529 B2 | 9/2012 | Goulart |
| 8,364,486 B2 | 1/2013 | Basir et al. |
| 8,732,623 B2 | 5/2014 | Liang |
| 9,318,129 B2 | 4/2016 | Vasilieff |
| 9,584,946 B1 * | 2/2017 | Lyren .................. H04S 7/30 |
| 10,044,873 B2 * | 8/2018 | Tinsman ............ H04M 1/6008 |
| 10,109,300 B2 | 10/2018 | Vasilieff |
| 2003/0018475 A1 | 1/2003 | Basu et al. |
| 2003/0123754 A1 | 7/2003 | Toyama et al. |
| 2003/0197608 A1 | 10/2003 | Rudhard et al. |
| 2004/0257536 A1 | 12/2004 | Bierhuizen et al. |
| 2006/0031067 A1 | 2/2006 | Kaminuma et al. |
| 2006/0104457 A1 * | 5/2006 | Kawaguchi ........... H04N 7/147 |
| | | 381/91 |
| 2008/0017547 A1 | 1/2008 | Burns et al. |
| 2008/0071547 A1 | 3/2008 | Prieto et al. |
| 2008/0144886 A1 | 6/2008 | Pryor et al. |
| 2008/0235026 A1 | 9/2008 | Garratt et al. |
| 2008/0292146 A1 | 11/2008 | Breed et al. |
| 2008/0306733 A1 | 12/2008 | Ozawa et al. |
| 2009/0002361 A1 | 1/2009 | Dote et al. |
| 2009/0061841 A1 | 3/2009 | Chaudhri |
| 2009/0125401 A1 | 5/2009 | Beenau et al. |
| 2010/0205667 A1 | 8/2010 | Anderson |
| 2011/0059798 A1 | 3/2011 | Pryor et al. |
| 2011/0143811 A1 | 6/2011 | Rodriguez et al. |
| 2011/0161076 A1 | 6/2011 | Davis et al. |
| 2011/0170746 A1 | 7/2011 | Pryor et al. |
| 2011/0184735 A1 | 7/2011 | Flaks et al. |
| 2011/0216153 A1 | 9/2011 | Tasker et al. |
| 2011/0257971 A1 | 10/2011 | Morrison et al. |
| 2012/0272179 A1 | 10/2012 | Stafford |
| 2012/0295708 A1 | 11/2012 | Hernandez-Abrego |
| 2012/0324495 A1 | 12/2012 | Matthews, III |
| 2013/0022216 A1 | 1/2013 | Ganong, III et al. |
| 2013/0044893 A1 * | 2/2013 | Mauchly ............... H04M 3/568 |
| | | 381/92 |
| 2013/0218563 A1 | 8/2013 | Basir et al. |
| 2015/0116212 A1 | 4/2015 | Freed |
| 2016/0182727 A1 * | 6/2016 | Baran .................. G08B 21/18 |
| | | 379/88.02 |
| 2018/0197525 A1 * | 7/2018 | Kikuhara ................. H04R 3/00 |
| 2018/0286431 A1 * | 10/2018 | Cutler .................... G10L 25/78 |
| 2018/0366118 A1 * | 12/2018 | Lovitt .................. G06F 16/635 |
| 2019/0057716 A1 | 2/2019 | Vasilieff |

\* cited by examiner

SYSTEM AND METHOD FOR MANAGING A MUTE BUTTON SETTING FOR A CONFERENCE CALL

BACKGROUND

1. Technical Field

The present disclosure relates to managing the mute and unmute feature with respect to communication conferences and particularly to an automated approach to managing the mute and unmute feature.

2. Introduction

Teleconferences and video conferences are common in today's interactions between individuals and groups of individuals. Often, during a telephone conference, attendees need to frequently mute and unmute their phones. One reason an attendee might mute their phone is because of background noise, which can exist because they are in a city with street sounds such as sirens. Highly sensitive microphones might pick up the movement of papers on the table, keyboard typing or the movement of blinds on a window. In some cases, attendees might be at home and have children or dogs in the background which also cause background noise.

In some scenarios, attendees often will place their phones on mute to hide the background noise and forget that they are set on mute. In this scenario, an attendee may start speaking for a period of time, assuming that other participants in the conference can hear them, when in fact they cannot be heard because the phone is set to mute. In another scenario, an attendee of a teleconference might forget that they are not on mute and start speaking with a colleague or somebody else in the room, which conversation can be heard by members of the conference. An attendee in a room that is moving papers or has moving blinds may not understand how that sound can be amplified by the system to others in the conference. In other words, the person in a room may not know that the rustling of the papers on a table is really loud to other people in the conference due to the characteristics of the microphone picking up that sound.

DESCRIPTION

The present disclosure addresses the deficiencies in present telephone or communication systems with respect to the operation of the mute feature. The concepts disclosed herein can apply to any conference, whether audio only, video, or any other medium of communication in which a mute or unmute button or feature may apply.

Generally speaking, the system disclosed herein involves an automatic detection of whether an attendee is speaking or not. In one example, the system determines that the attendee is speaking and automatically unmutes the attendee's indication device, such that other participants in the conference can hear the attendee.

The disclosure also includes other aspects that are generally related to the concept described above. For example, the system can also detect non-speech audio such as the movement of papers, the typing on a keyboard, animal noises or children noises, and so forth, and automatically mute the microphone.

BRIEF INTRODUCTION

Methods and systems are disclosed for addressing the technical problem associated with the use of a mute feature in connection with the communication device for conference session.

An example method includes establishing a communication conference between at least a first user having a first device and a second user having a second device, setting a mute feature on the first device associated with the first user such that the mute feature is on, detecting, while the first device is on mute, whether the first user is speaking to yield a determination and, when the determination indicates that the first user is speaking, automatically setting the mute feature to off to enable the second user to hear the first user in the communication conference. The steps that are disclosed can be performed either on the first device exclusively, on a network-based server or device, or based on a combination of processing between two or more devices. Detecting whether the first user is speaking further can include using a voice activation detection module which is operational on the device and/or a network-based server. Detecting whether the first user is speaking further can include distinguishing between speech from the first user and a background noise, and making mute or unmute decisions based on a classification of the audio.

Additionally, determining that the first user is speaking can include a more focused approach of determining whether the speech is intended for the second user in the conference. Detecting whether the first user is speaking and intending to speak in the conference can be based at least in part on one or more of a voice detection module, facial recognition data, gaze detection data, background noise, motion detection, and audio volume data. Classifiers can be trained and used to classify received audio as background noise or speech. In this scenario, the classification can even be more detailed than merely classifying audio as speech or not. For example, the classifier can be trained to determine whether first, the audio is speech and second, whether the audio is intended for a conference call or a video communication session. Speaker identification can also be included in the analysis to insure that the speech is from the expected individual who is participating in a conference session. This type of classification requires additional training of the classifier to take into account the type of speech that is being received, the direction of the user's face or mouth such as whether the user is facing a computer or turning away to talk to a different person within the room. The classifier may also be trained on the volume of the speech, the cadence, the content, whether the speaker is whispering, speaker identification information, and so forth. There are certain characteristics of speech associated with a communication session and speech that is spoken during a communication session but that is not intended to be part of the communication session. Accordingly, the classifier can be trained on the differences between these two different types of speech so as to determine or classify whether speech received during a communication session is intended for the communication session or as a sidebar or separate conversation. The classifier can also include a speaker identification component or module that is trained to identify the speaker. For example, the system may receive audio, identify it as speech and determine that it appears to be speech intended for a conference call. However, if the speaker identification component determines that the user is not an expected participant in the call, then the mute/unmute decision can take that into account and likely mute the device for that speaker.

Classifiers can also be trained on video or other types of communication data as well. For example, a video camera can receive a video feed of the user and pass raw data or process data to a classifier which can aid in the determination of whether the speech received is intended for a conference or not. Video/camera data can aid of course in speaker identification as well. Generally, the concepts described above are useful in determining when to automatically turn off a mute setting such that the user's speech that is intended for teleconference will be heard.

In another aspect, the concepts disclosed herein can determine when to turn a mute feature on. For example, the method can include establishing a communication conference between at least a first user having a first device and a second user having a second device, setting a mute feature on the first device associated with the first user such that the mute feature is off, detecting, while the first device has the mute feature off, whether background noise exists in the communication conference at a predetermined threshold to yield a determination and, when the determination indicates that the background noise exists at the predetermined threshold, automatically setting the mute feature to on to prevent the second user from hearing sounds from the first device in the communication conference. The step of setting the mute feature to be off is optional as a default setting. The mute feature can be on or off by default. When the default setting is mute being off, the step of setting the mute feature may not be needed.

The step of detecting whether the background noise exists in the communication conference at the predetermined threshold can be performed on the first device, on a network-based server, or combination of both. Detecting whether the background noise exists in the communication conference at the predetermined threshold further can include using a background noise detection module which operates on a local device, a network-based server, or both.

The present disclosure addresses these various aspects of automatic turning on or turning off of a mute feature in connection with a communication conference between at least two people.

DETAILED DESCRIPTION

Various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1, which can be employed to practice the concepts, methods, and techniques disclosed, is illustrated. A more detailed description of specific embodiments will then follow. These variations shall be described herein as the various embodiments are set forth. The disclosure now turns to FIG. 1.

Figure 1:
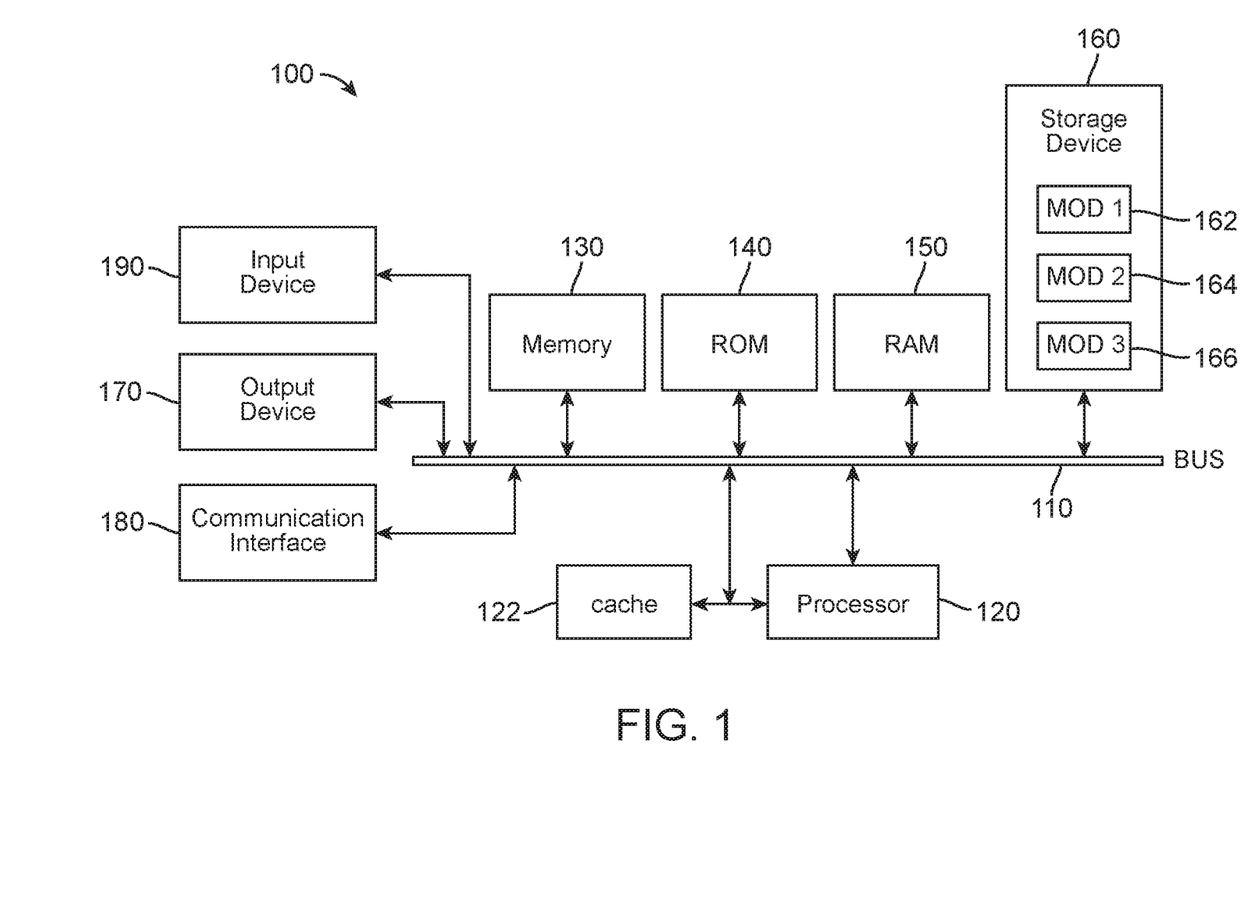
FIG. 1 illustrates an example system embodiment.

With reference to FIG. 1, an exemplary system and/or computing device 100 includes a processing unit (CPU or processor) 120 and a system bus 110 that couples various system components including the system memory 130, such as read only memory (ROM) 140 and random access memory (RAM) 150, to the processor 120. The system 100 can include a cache 122 of high speed memory connected directly with in close proximity to, or integrated as part of, the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations. The system component of FIG. 1 can include a mute management module, which can be any of the modules 162, 164, 166 and which can operate as a local mobile or desktop device that the user holds or speaks into and/or can be a module configured on a network-based server, which can perform the specific functions disclosed herein. Furthermore, a load-balancing or sharing of the performance of specific steps can also occur in part on a local mobile device or desktop device, and a network-based server.

Figure 2A:
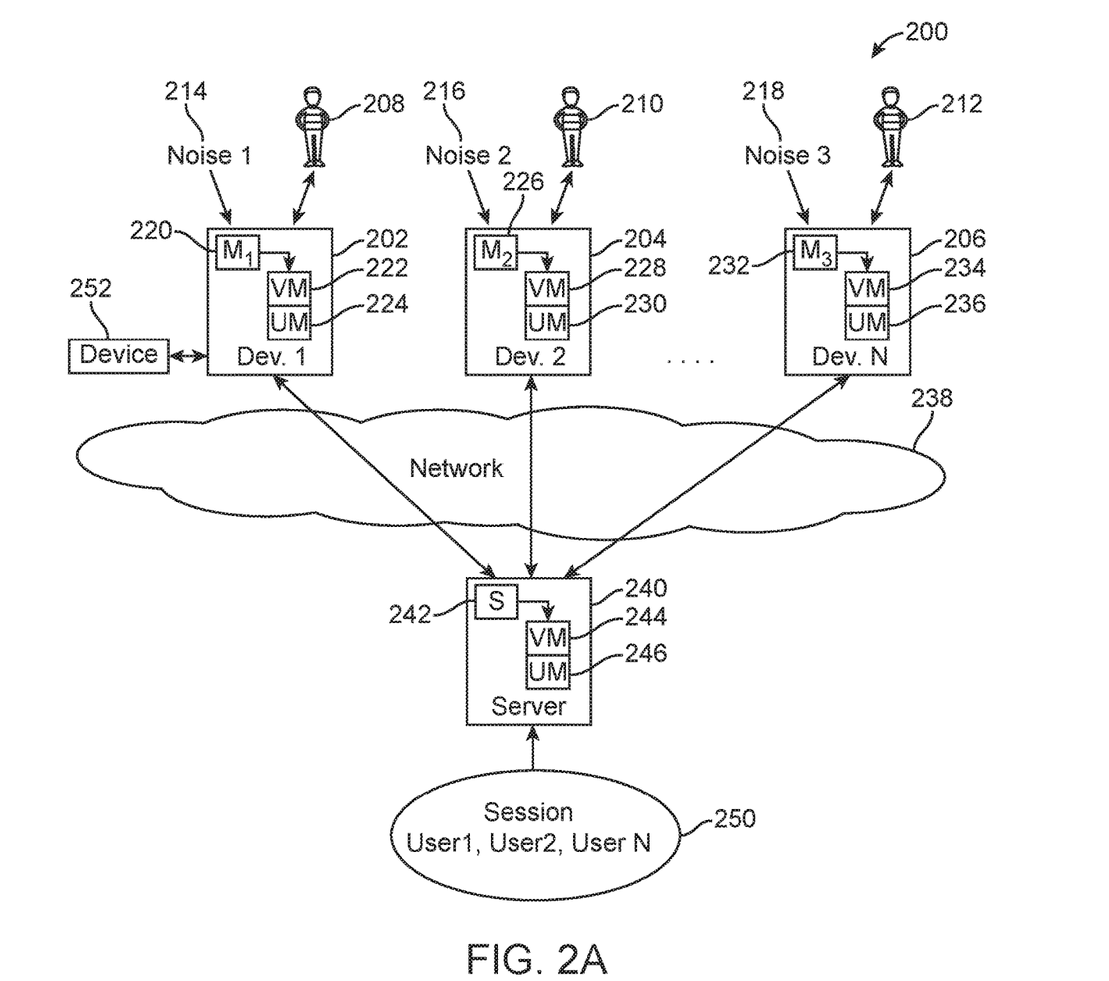
FIG. 2A illustrates an example conference call with one or more attendees on mute.

Having disclosed some components of a computing system, the disclosure turns to FIG. 2A, which illustrates the basic components 200 of the system described herein. The system 200 includes a number of different devices. For example, devices 202, 204 and 206 each represent a respective device used by respective users 208, 210, 212. The devices will include one or more of a microphone, a video component (or other input/output components such as a speaker or display), and communication components for communicating via a network 238 with a network-based server 2404 establishing a communication session 250. Two or more individuals will typically be involved in a communication session. Each user can have background noise associated with their respective communication. Noise 1 (214), noise 2 (216) and noise 3 (218) can represent any kind of background noise, such as a user, coughing, sirens, animals, children, keyboard typing, moving blinds associated with a window, paper being shuffled on a desk, and so forth. In one aspect, the background noise can actually be a user speaking but the speech is not intended for the teleconference. In another aspect, a speaker, ID indication module can identify through the audio. The identity of the user and make a determination regarding whether to mute/unmute or take some other action if the user is not a participant in the *commune* occasion session. This is an important factor in that otherwise, the system may determine that the audio is speech, and likely intended for the conference, but the fact that the individual is not a participant in the conference can lead to a conclusion or determination to mute the device associated with that user. A dialogue can also be initiated in such a scenario as to notify the user that they are not part of the conference and that they may need to enter an access code or confirm their participation. A notice in this scenario can also be provided to a conference host who might be conducting a confidential discussion. In this case, the system may let the host know that an unidentified or unexpected user seeks to participate in the conference and give the host through a user interface options to enable that user to gain access or to prevent that user from accessing the conference.

Each device 202, 204, 206 can include a respective module 220, 226, 232 which can be a software or hardware/firmware component that is built into the respective device for managing the process of automatically muting and/or unmuting the respective device or for performing processing as disclosed herein and providing an instruction to another device that actually mutes or unmutes.

The respective modules 220, 226, 232 are shown as controlling the setting on the respective device 202, 204, 206 to be either in a mute "on" mode 222, 228, 234 or and unmute or mute "off" mode 224, 230, 236. The network-based server 240 can also include a module 242 which can manage a mute "on" mode 244 and an unmute or mute "off" mode 246.

This disclosure addresses the issue outlined above, which involves users often being unaware of the mute/unmute status of a communication session 250 and speaking when they are on mute or having excessive background noise when the device is on unmute such that other individuals hear the background noise. In some scenarios, individuals joining a conference session 250 will automatically be set to mute. In other conference sessions 250, users have to manually mute themselves to hide the background noise from their location. The technical solution disclosed herein can simplify the experience for participants in a conference session such that they do not have to manage or be aware of whether they are on mute or unmute.

Additionally, this disclosure can apply the principles disclosed herein to any kind of communication session in which a mute or unmute concept or feature is applicable. For example, Skype, WebEx, teleconference calls, and so forth, can all include a mute/unmute feature. Each specific type of communication session can include respective technical components or features in the present disclosure can apply to any of these different types of communication sessions. The principles apply to mobile devices that users may use and can also apply to desktop devices as well. Any other type of device is also contemplated as long as it is used to access a communication session 250.

The principles disclosed herein can apply to muting/unmuting audio, but can also apply to muting or unmuting video, text data, multimodal data, gesture data, or any other type of data, or combination of data. For example, in a video conference, the user may have a source of extreme light behind them, such as through a window, which can be annoying to other viewers of a video conference. This extra extreme light can be considered "noise" in a similar sense to the audio noise, which is discussed in the primary embodiment disclosed herein. The process could also apply to documents that may be presented as part of a communication session 250.

In one example, assume that a first user 208 is communicating via a device 202 with the server 240 to participate in a communication session 250 with a second user 210. The number of users, or user devices associated with a communication session 250, can vary and typically includes two or more users and respective user devices. In this example, assume that the first user 208 has joined the communication session 250 and has muted their device 202. In that scenario, the background noise 214 associated with the environment around the first user 208 will not be heard in the communication session 250. However, assume that the user 208 has forgotten that they are on mute or that the mute feature is turned to "on". The user 208 might start talking thinking that other users 210 in the communication session 250 will be able to hear them. The concepts disclosed herein involve detecting whether the user 208 is speaking. The detection of whether the user 210 is speaking can occur through a voice activation detection unit, module or component that is configured on the device 202. The voice activation detection unit, module or component can be characterized as feature 220 on the device 202. A network-based component can also make the determination of whether audio is speech from a user.

The voice activation detection component 220 can include a noise classifier, which can be trained to identify whether a received noise is speech from a human or is a typical background noise 214. A noise classifier 220 can be trained on keyboard typing, coughing, sneezing, blinds moving, sirens, animal noises, whether noises, children related noises, and so forth. The classifier may return a result of "yes" the audio is speech from the user or "no" the audio is not speech from the user. Additionally, the classifier or neural network can further be trained to characterize the speech as speech intended for a conference, or other speech, such as a user turning over their shoulder to talk to somebody behind them, even while they are holding a headset and participating currently in a conference session. The training would include training to distinguish not only whether the audio is speech versus background noise, but what is the type of speech with respect to whether the speech is intended or likely to be intended as part of the communication session as opposed to speech to another person in the room, and thus not intended for the communication session 250.

The system can determine a direction or an orientation of the user's face (whether it is towards a computer screen or facing a door behind them, or to the side), which can be data included in the algorithm or model to determine whether the speech is intended for the conference. The speech may be at a certain volume, or particular words might be used that relate to the conference or not, and thus the content of the speech may be used to determine user intent to be part of the conference. The user intent can be inferred by the system based on the audio/visual/other data received and evaluated. The system can use machine learning to recognize that when a user is staring out the window and talking, they often do that as part of the conference session 250. Based on such a determination, and by the system distinguishing between talking to the conference and background noise or side speech, the component 220 can automatically unmute 224 the device 202, such that the speech provided by the user 208 will be heard by other users in the communication session 250, or mute the device 202.

Device 202 can also include components capable of handling a videoconference or can include video capability even when the user is on an audio-only conference session. In either case, video input provided to the device 202 can also be received or provided to the component 220 such that facial recognition, gaze detection of the user 208, head orientation, and so forth, can be evaluated to determine whether the user 208 is oriented to the computer which could indicate that the user is speaking to the conference, or is oriented elsewhere, such as talking to somebody else in the room or looking out a window. Such visual feedback or data can be provided to the component 220 to make a classification decision regarding whether the user is speaking as part of a conference or is speaking to another person in the room and is thus not providing speech intended for the conference participants. Other cameras in the room may also be in communication with the system and provide a more complete picture of the posture, orientation, or movements of the user, which can aid in making a determination.

It is noted that any type of machine learning or statistical classifier can be implemented as disclosed herein. For example, approaches that might use supervised learning include classification and regression approaches, clustering, dimensionality reduction, neural nets, reinforcement learning, machine learning, bayesian techniques, and so forth. These various types of machine learning or artificial intelligence can be implemented as part of the classification module or models disclosed herein.

The component 220 can perform this classification step or determination regarding whether the user is speaking as part of the conference or not based on processing that occurs exclusively on the device 202. In another aspect, the processing can be divided between the component 220 on a mobile device, a desktop device 202 and a network-based server 240 which can also have a classification component 242. In some cases, the local device 202 may obtain or receive audio and/or visual data and parameterize such data for communication to a more powerful network-based server 240 for making the classification determination. In one aspect, a classification server might be deployed on a network and used to make a classification decision regarding whether audio (or other non-audio data) received is intended for reception by participants in the communication session 250. The classification server might be a separate server from a communication session server, which is used to manage the communication session 250. Thus, the functionality disclosed herein can be combined with a server or servers used to manage a communication session 250 or may be a separate component or entity.

This disclosure can provide support for claims that are drafted from the standpoint of any component disclosed within the system 200. For example, claims can be directed to functionality performed by a local device 202, 204 or 206. The device is local to the respective user 208, 210, 212 and will directly receive audio, images, video, or other data associated with the user and the communication session 250. Data processing, classification decisions, and automated control of the mute/unmute feature associated with these respective devices can occur locally on such a device. In another aspect, claims can be directed to functionality associated only with a network-based server 240 which can involve generally the process of receiving data from a local device and evaluating or processing the data to make a determination or classification decision regarding whether audio that is being received by a respective local device is speech intended by the user for the communication session 250. It is noted that the server 240 can manage a mute/unmute feature for each respective local device such that the muting or unmute in can occur at the server level. In another aspect, the server 240 can make a classification decision relative to an individual user 208, 210, 212 and transmit an instruction to one of the local devices 202, 204, 206 which causes or results in the local device setting a mute/unmute feature. The instruction can also be to a server managing the communication session 250 to mute/or unmute a respective participant.

In another aspect, part of the processing can occur on a local device and part of the processing can occur on a network-based device to make a classification decision regarding whether the user desires to communicate with a communication session. As is noted above, while examples are provided of audio communication being used to determine whether a user desires to speak as part of a communication session 250, but other modes of communication can also be determined, such as whether the user desires to join a video component to a videoconference. For example, a user may be on a Skype video conference and be facing a computer screen with a camera that determines that the user, at that moment or during that period of time, desires to be engaged with a videoconference. However, if the user turns away or turns their back on the computer screen and talks to an assistant or another person in the room, the system could detect that there is no longer is facial recognition data in the video camera and that the system is going to "mute" the video feed to the video communication session 250. As the person turns back to the computer screen, the system may unmute the device based on a probability that the user now is communicating again with the communication session.

Similarly, the system could initiate, in a videoconference, an exclusive audio component for a user who is not at their desk but is in the room. While the user is walking around, only audio is presented to the other conference participants during that time. As the user sits down and engages with a computer screen or is a certain threshold distance from the computer screen such that the system can detect a proximity of the user to the screen or a video camera, and/or facial recognition capability identifies that the user is the proper user and appears to be gazing in the proper direction, then the system can unmute or turn on the video feed for the communication session.

Thus, any of the respective local devices 202, 204, 206 can include a gaze detection module or component, a facial recognition module or component, a camera or video camera that can be utilized to receive data associated with the gaze, configuration, location of the user, temperature, user facial orientation, and so forth associated with the user participating in a communication session 250. This information can be applied to the algorithm for evaluating whether to mute or unmute a communication mode for a communication session.

In one example, the user uses a telephone, handset or headset to communicate with a teleconference 250. In many instances, office workers have a desktop or laptop computer and a desktop phone through which they participate in teleconferences. Multiple devices that are each considered local to a user participating in a teleconference can communicate with each other in order to manage the automated use of a mute or unmute feature. For example, in some scenarios, a desktop telephone has a communication capability with a user's desktop or laptop computer. The computer can be set up for a Skype session or have a video camera and processing capability. A communication link, wired or wireless, can exist between a desktop phone and a desktop computer, both being separate devices.

The interaction between the devices can include the following. A user dials into a teleconference 250 using a telephone 202. A communication link between the telephone 202 (which could also be a mobile phone) and a desktop device (which can be a laptop or other device) 252 can be established. In such a scenario, assume that the device 252 has a camera capable of capturing images of the user. The device 252 can coordinate data with the telephone 202, such that a camera on the device 252 can monitor the user such that gaze detection, facial recognition, posture, facial orientation, or any other data that can be captured or utilized from visual images of the user. Such data can be utilized to make a determination about whether to automatically turn on or off a mute feature. The data can be transmitted from the device 252 to any other device to use in running the classification algorithm. The control of the mute feature can be on various devices. For example, the control might be at the desktop phone, or on a mobile phone. In another aspect, a user might need to press a number on their desktop phone to implement a mute or unmute feature that is operational or actually implemented on a network-based server. The principles disclosed herein would apply to any of these approaches regarding which device actually implements a mute or unmute feature.

In one example, as the user initiates a teleconference on a phone 202, the phone may identify that the user is part of a teleconference with multiple individuals or with a single individual. A component 220 on the phone 202 can initiate a monitoring process to determine whether to automatically mute or unmute the device. A signal can be provided from the device 202 to a desktop or separate device 252, which can initiate modules or components on that device 252 to monitor the user for certain data. For example, a component built into or operable on the device 252 can monitor and identify whether the user is looking at a computer screen, or is looking away or is walking around the room. The device 252 can capture such data, parameterize the data (optionally) and transmit that data to another device. The device 252 can make a classification decision and pass the decision to the device 202 to aid the device 202 in making a determination regarding whether to automatically turn on or turn off a mute feature. The device 252 may just provide the instruction to mute or unmute the device 202. Device 252 may also receive audio as well through a microphone. The data captured from the two different devices can be coordinated and combined via the component 220 on the device 202 and/or in connection with any other server 240 associated with a network. Indeed, device 252 might provide a different view of the user or different data associated with the user then could be captured from the device 202. In this regard, the additional data or data gathered from two different devices can be coordinated in order to make an improved classification decision regarding whether the user is speaking in connection with a communication session 250 or not. Based on the determination, the system, via one or more of the disclosed devices, can automatically mute or unmute the user.

Figure 2B:
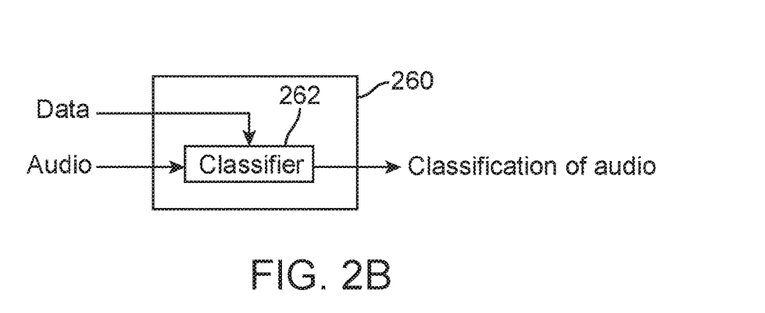
FIG. 2B illustrates an example classifier using speech plus other data.

FIG. 2B illustrates a device 260 having a classifier 262, which is utilized to receive speech and make a classification decision regarding whether the speech is intended to be part of a communication session. As shown in this figure, the classifier not only receives audio but also can receive other data. The other data can be in the form of video data, an image, text, other audio, or process data associated with any of these types of data. For example, a video camera might receive video data associated with the user that is participating on a conference call. The camera or a computing device associate with the camera might receive the video data and determine that the user has turned away from a computer screen and is looking at another individual in the room. The raw data or parameterized data can be fed to the classifier and utilized to determine whether the speech received from the user is intended for the current conference session or not. The other data may also be concurrent data generated by the user, such as emails, texts, other documents, and so forth which might indicate that the user is working on a separate project and is possibly does not want to participate in the conference session at that time.

Figure 3:
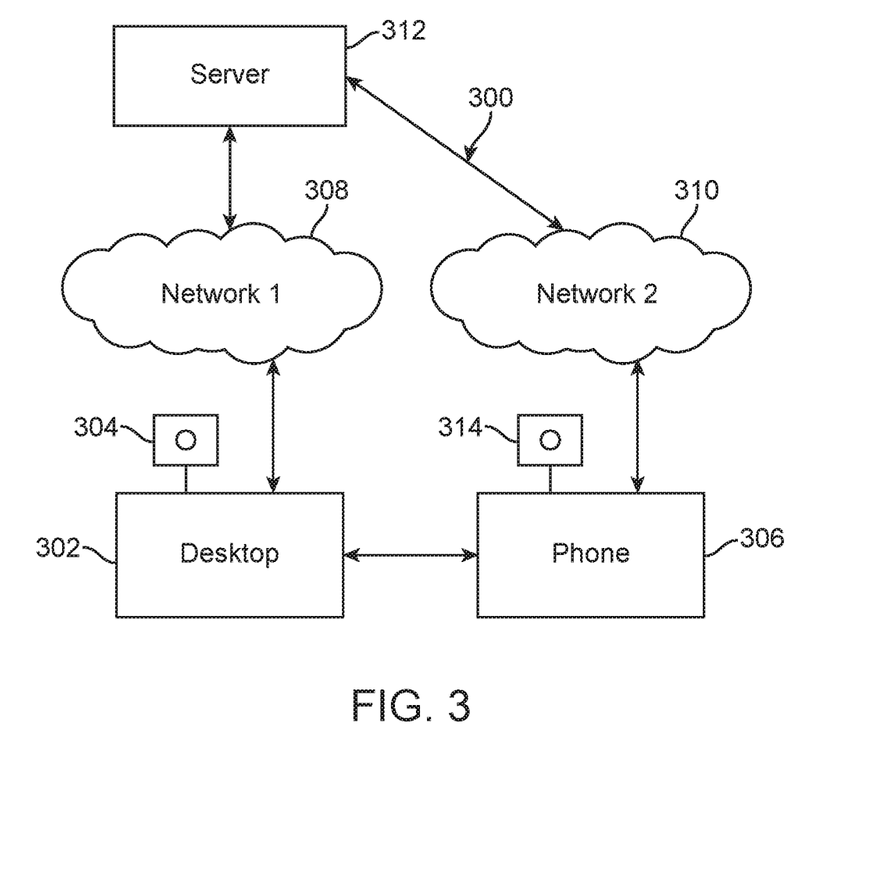
FIG. 3 illustrates a system including a phone and a separate computing device.

FIG. 3 illustrates a system embodiment 300 which includes the concept of coordinating data between a computing device 302 such as a desktop or laptop computer and a phone 306. In this scenario, the user might be at their office desk and have a telephone 306 use for making telephone calls. The telephone utilizes a network 310 to communicate with a server 312, or other device which manages a teleconference. In some scenarios, the telephone 306 will have a video device 314 that can capture video of the person speaking. In this scenario, the phone 306 can include a module as disclosed herein for evaluating visual images of the user for making determinations regarding whether to mute or unmute the phone.

In other scenarios, the phone 306 may not have a video module but the user's computing device 302 will have a video camera or video module 304 that can be used for Skype or other videoconferencing purposes. In this aspect, the system includes coordination between the computing device 302 and the phone 306 such that the camera 304 can be accessed and utilized by the phone to make automatic mute/unmute decisions. For example, the phone 306 can have a module which can be programmed to interact with a corresponding module on the device 302. As the user starts a telephone conference utilizing the phone 306, the phone 306 can established communication with the device 302 indicating the conference has begun or is about to begin, and that the mute/unmute modification feature is operational. The device 302 can then initiate the camera 304 and start to receive data viewing the person on the phone 306. Gestures, gazes, motion, or any other visual or audible data can be gathered about the individual and processed on one or more of the device 302, the phone 306 and/or the server 312. The device 202 can also capture other user activity like Internet use, documents worked on, texting, emailing, video watching, and so forth. This can be valuable data used to determine whether the user speech is intended for a conference.

In one aspect, the device 302 communicates data to the phone 306 for processing by the module for determining whether to mute or unmute the phone 306. Therefore, the phone 306 can receive visual data, audio data, gesture data, motion data, user work data, and/or any other kind of data retrieved from input devices associated with the computing device 302. The device 302 transmits that data to the phone 306 for use by the mute/unmute module. As noted, the computing device 302 may perform some level of preprocessing, such that raw data is not communicated to the phone 306, but parameterized or classification data is communicated. In this approach, where the phone 306 is missing an input mechanism that can receive data about the individual that would be helpful in determining whether to mute or unmute the phone 306, the phone 306 can coordinate with a separate device which does have the input capabilities and receive that data from the separate device. The device 302 can also run the classification algorithm based on data received from the phone and camera data from the device 302. The instruction to mute or unmute based on the decision can be provided from the device 302 to the phone 306 or to a network based device.

Another aspect, the computing device 302 can also receive audio and/or video from an input component 304 (microphone or headset, etc.) and can communicate via a network 308 with a server 312 in order to participate in a teleconference or videoconferencing session. The computing device 302 can also include a module or modules as disclosed herein for the purpose of gathering data and making a determination as to whether to mute or unmute the device 302. In one scenario, the user is utilizing the computing device 302 to participate in an audio or video conference with another user over a network 308. Network 308 and network 310 can also be the same network as well.

The computing device 302 can include a module or programming to perform the functionality described herein. Thus, the computing device may utilize a microphone and/or a video device 304 to receive data associated with the user actions, such as movements, gazes, motion, user interaction with documents or applications and speech to determine whether to automatically mute or unmute the microphone. The muting or unmute in of a microphone can occur at the local computing device level 302, or may occur in connection with a network-based server 312 that manages a communication session. Thus, the computing device 302 might include programming to receive the various pieces of data described herein and communicate the data or a parameterized version of the data to a network-based server 312 for evaluation and muting or unmuting.

In another aspect, the device 302 might be a mobile device that communicates via a network 308 with other devices or computing components 312. The communications described herein may be landline, cable, fiber, or wireless between any two described devices. The process of making a classification decision regarding whether the user either desires to speak as part of a communication session or not, and thus make a determination regarding whether to automatically mute or unmute the user, can occur in a number of different components. For example, the processing might occur on a local device 302, or may be performed on a more powerful network-based server 312. In another aspect, the system might make a determination regarding whether to perform a local calculation or send data or parameterized data to a network-based server 312 for processing. The decision regarding where and how to process the data to make a classification decision can also be based on whether the muting or unmuting function is a local function for the computing device, or is a network-based function that would be implemented by a network-based server 312. For example, some phones perform muting and unmuting locally via a button. In some cases, conference calls are initiated by a network-based device 312, which automatically mutes all participants as they enter the call to reduce background noise. Each device disclosed herein that is part of a conference session can include a mute/unmute module, which can communicate data with corresponding mute/unmute modules on other devices such that the overall system can identify how and where the mute/unmute functionality would be implemented for a particular communication session, which devices should perform algorithmic functions to evaluate receive data to make mute and unmute decisions, and so forth. All communication of data, requests, responses, confirmations, instructions between devices, where in one device is utilized to make a mute/unmute determination and needs to provide an instruction to another device that actually implements the mute/unmute operation included within this disclosure. In one aspect, application programming interfaces, or other syntax or protocols can be used to enable such communication between devices according to a particular syntax.

Flexibility could be built into mute/unmute management modules, such that a new caller or a new device can be used to call into a conference session and via an application programming interface or other background communication, the device can communicate its capabilities (video, audio, mute/unmute, etc.) and the system can negotiate or determine how and when an automatic mute or unmute function would be implemented for that user. For example, some telephones used to call into a teleconference might not have a mute function, while others might. Some devices associated with a telephone conference might have a video component which can be implemented to retrieve video data about the user as they participate in the telephone conference, and which could be leveraged by a classifier to make determinations regarding whether speech received from the user is intended for the teleconference or not. Thus, in one aspect, different functionality might apply to different devices participating in the same communication session based on the capabilities of those devices. All of the communication of requests for data, responses, authentication, encryption, and/or handshake operations, are included as part of this disclosure. Thus, all of the various functions of establishing communications, exchanging device capabilities, configuring in an automated or manual way, retrieving or receiving data and evaluating that data to make a determination regarding whether background noise exists or whether a respective user's speech as part of a conference sessions intended for the participants in the conference, and providing a mute/unmute command, are included as part of this disclosure. Further, claims can be drafted that would be directed towards any individual component in the overall network of components, to cover the functions performed by that component, data received by the component, instructions or communications from that component, and so forth. Thus, claims can be directed to a phone, a mobile phone, a desktop computer, a network-based server that manages a communication session, or any combination of these components.

In one aspect, a plug-in or computer program or application can be downloaded to a device, such as a mobile phone, which can implement the functionality disclosed herein. The application can access the phone's input devices such as motion detection, gyroscopes, video components, audio components, fingerprint components, facial recognition components, and so forth, to make evaluations and determinations regarding whether speech or other input received from the user are intended for the conference session.

Embodiments can be claimed in terms of the functionality of the computing device 302 and instructions it receives, data that it gathers, and data that it communicates to the separate device 306. In another aspect, an embodiment can be claimed from the standpoint of the device 306 that transmits a request to the separate computing device 302 for additional data that can be utilized to make mute or unmute decisions. The device 306 then receives, in response to the request, one or more of video data, audio data, gesture data, motion data, and so forth which can be raw data, parameterized or processed data, or direct mute/unmute commands. The received data is incorporated into the evaluation or analysis of whether to mute or unmute the device 306 as part of a conference call.

Figure 4:
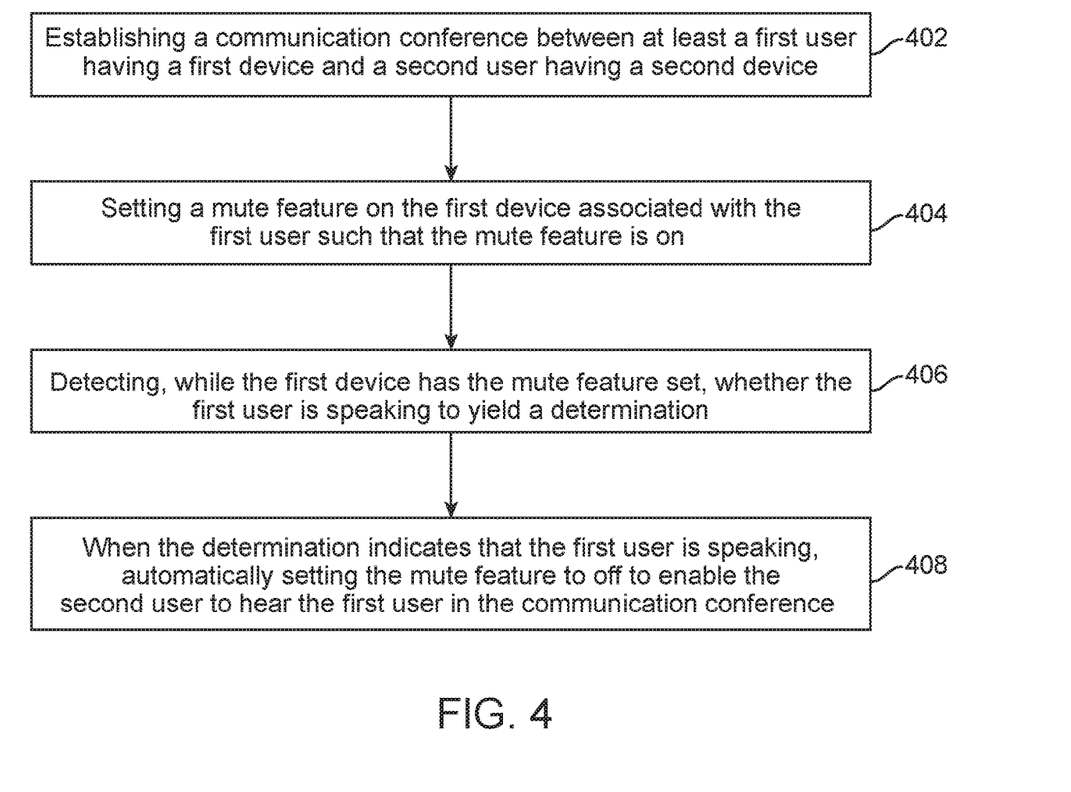
FIG. 4 illustrates method embodiment.

FIG. 4 illustrates an example method which relates to processing that occurs when a mute feature is set to "on" and the system might need to automatically turn off the mute feature to enable the user to be heard, seen, and so forth. An example method includes establishing a communication conference between at least a first user having a first device and a second user having a second device (402), setting a mute feature on the first device associated with the first user such that the mute feature is on (404), detecting, while the first device has the mute feature set, whether the first user is speaking to yield a determination (406) and, when the determination indicates that the first user is speaking, automatically setting the mute feature to off to enable the second user to hear the first user in the communication conference (408). As noted herein, the determination that the first user is speaking can also further indicate that the speaking is meant for the communication conference.

Detecting whether the first user is speaking further can include using a voice activation detection module which is operational on the device and/or a network-based server. Detecting whether the first user is speaking further can include distinguishing between speech from the first user and a background noise. Detecting whether the first user is speaking can be based at least in part on one or more of facial recognition data, gaze detection data, background noise, motion detection, and audio volume data. In some cases, background noise is allowed or tolerable and the system may not want to mute the device inappropriately. The problem with undesirable muting is that when a user at that location starts to speak, the other participants in the call will not hear that user. In this regard, the system can also determine that the user is not speaking in connection with detecting background noise. Thus, an automatic decision to mute the device may include not only an identification of background noise that meets a certain threshold of annoyance as well as a determination that the user at that location is not speaking.

In one aspect, setting the mute feature on the first device to "on" can be done based on a user setting the device to mute or in an automatic fashion. For example, in some teleconferences, users join in the teleconference with their respective devices automatically set to mute. In such a scenario, the method may not include setting the mute feature. Also, where the mute feature is turned on and off through a physical or virtual button, the system can provide an instruction to a user to mute/unmute their device.

Figure 5:
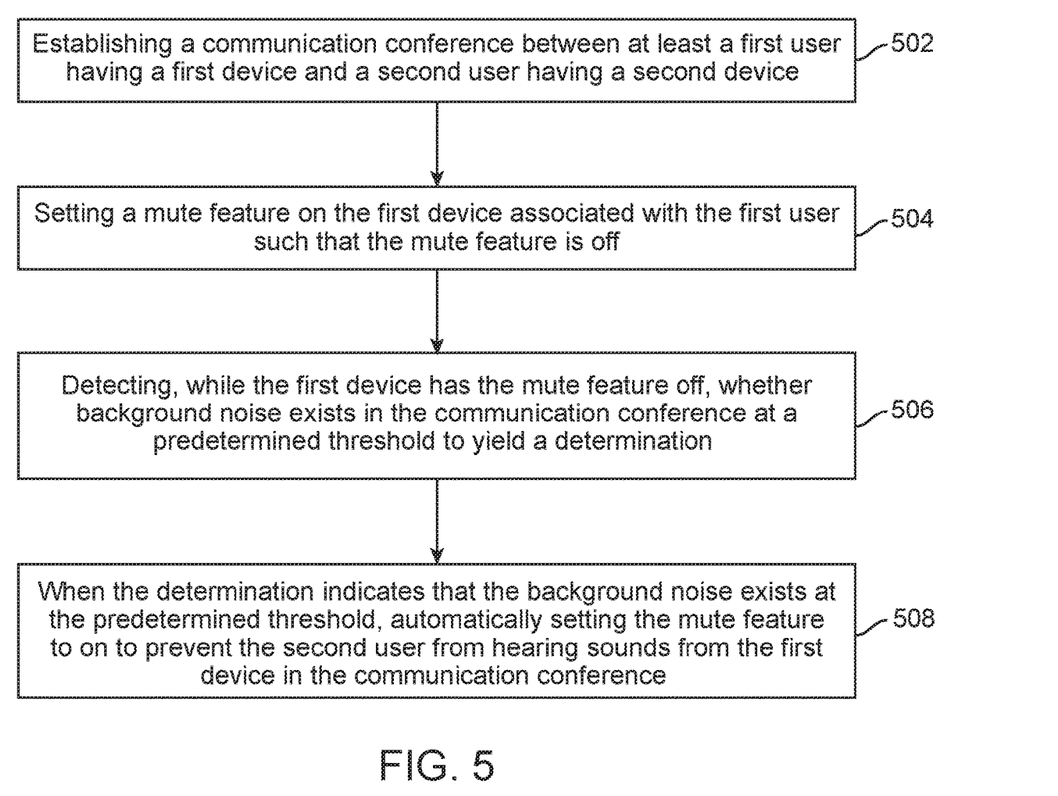
FIG. 5 illustrates another method embodiment.

In another aspect, shown in FIG. 5, the devices disclosed herein can determine when to turn a mute feature on. For example, the method can include establishing a communication conference between at least a first user having a first device and a second user having a second device (502), setting a mute feature on the first device associated with the first user such that the mute feature is off (504), detecting, while the first device has the mute feature off, whether background noise exists in the communication conference at a predetermined threshold to yield a determination (506) and, when the determination indicates that the background noise exists at the predetermined threshold, automatically setting the mute feature to on to prevent the second user from hearing sounds from the first device in the communication conference (508). The step of setting the mute feature to be off can be optional as the mute off setting might be a default.

In another aspect, the system can provide a user interface, which can provide notices or alerts to users. For example, if the system is on mute, and the individual start speaking, rather than automatically unmuting the user's device, a notice could be provided to the user asking whether they intend to have a live-mic or to speak at the conferencing. This notice could be provided as part of user interface based on the determination of a probability that the user does intend to participate in the conference, but that there devices on mute. The user interface could also provide a selectable object or spoken dialog interface in which the user can simply respond "yes" or press a button to unmute their device. The effort would be to provide this notice as quickly as possible, such that the user does not speak for a long time before receiving a notice that they are on mute.

In yet another aspect, the system can associated respective participants in a communication session with assigned roles. Depending on the assigned role, the system may automatically mute some participants, may establish a default to alert the user of a mute/unmute issue prior take an automatic action, and so forth. For example, the system may implement a mute first and alert second approach for users which can be based on the user role. Another user might have an alert first and mute second configuration. The issue of which configuration to apply to each individual user in the communication session can also be based on a timing aspect, such as whether the user has spoken for a while in the conference. For example, an active user might be less likely to have an automatic mute feature applied based on background noise. A less active user in a communication session might cause the system to establish a different threshold for when to mute that user based on background noise heard at that user's location. Thus, the system disclosed herein can include a dynamically changing threshold, which can adjust configurations for each respective participant in a communication session with respect to decisions regarding an order of taking actions. The actions can include mute, unmute, alert, engage in a visual or spoken dialog, partially mute, establish default settings, and so forth. For example, in one scenario, a participant in a communication session who does not speak for a period of time might have a mute feature set for their device even absent background noise. The goal in this scenario might be to anticipate background noise that may occur from that location and preemptively mute the device for that user. A notice of course can be provided to that user that they have been set on mute. Machine learning models can also be developed for each individual user based on their patterns of participation in communication sessions. The patterns can include not only user participation but background noises from that user's location. For example, one user might typically speak only at the end of a communication session and the system may identify that, over a period of 35 minutes, that sirens are often heard from that user's location, or they often shuffle papers on the table. A machine learning model can be developed using training data associated with these kinds of experiences with each individual user, including that user at a particular location, such that predictive decisions can be made by a classifier or a mute/unmute machine learning engine to make such decisions for such users.

In this regard, machine learning models can be developed and stored in a database for individual participants in communication sessions. When a respective user is scheduled to participate in a communication session and dials in from their desktop phone, for example, the system can identify one or more of the user, the user's location, the user's device, a time of day, and so forth, to determine whether to apply a trained machine learning model to that user with respect to making determinations regarding whether to mute/unmute/alert, and so forth. The machine learning models can also include such features as whether to enhance audio or particular user given the historical experience of individuals asking them to speak up or whether the audio from their standard location is often more difficult to hear the normal. In one communication session, the system can be applying 5 different individually based machine learning models in which each of the five individuals in the communication session has their respective model applied to their interactions. The end result is a much cleaner communication session with respect to background noise and improved experience for all the participants in the communication session.

Figure 6:
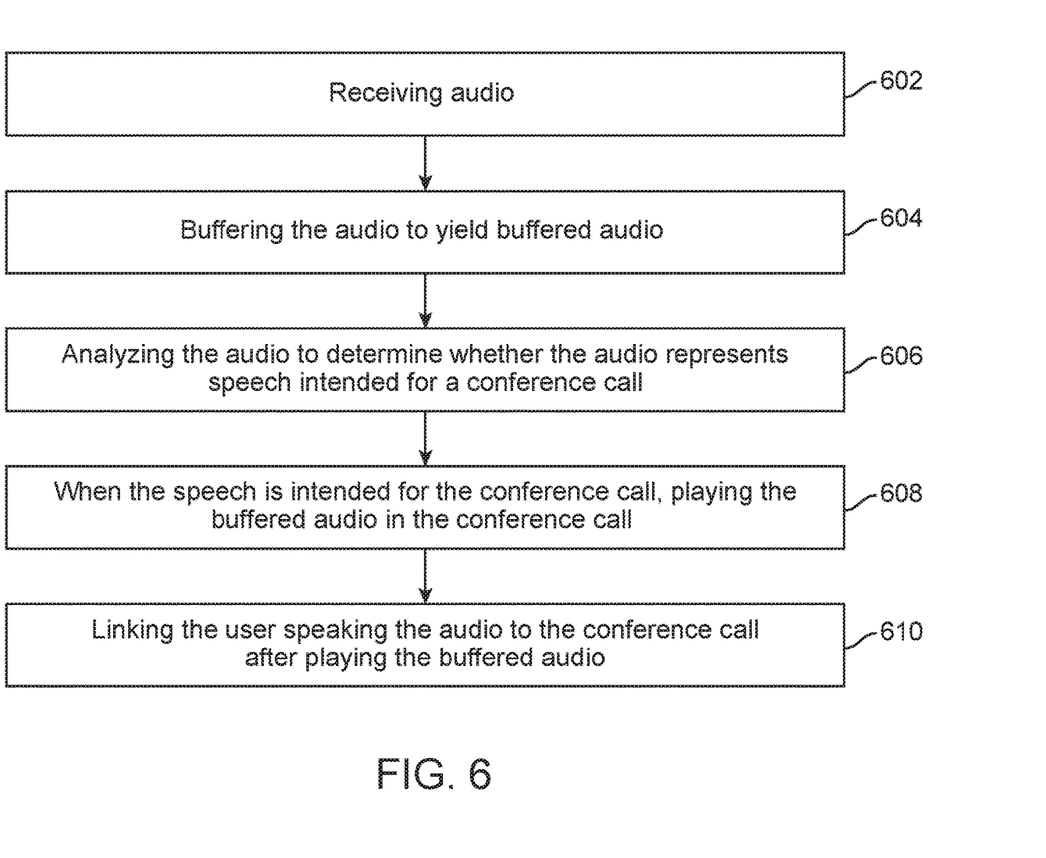
FIG. 6 is illustrates another method embodiment.

FIG. 6 illustrates another aspect of this disclosure related to a timing and buffering feature. The purpose of this feature is to address an issue with respect to the automatic muting or unmuting of a user device in a communication session. Running an algorithm to evaluate one or more input data is not instantaneous. For example, if the system is on mute and the user begins speaking, thinking that the input device is not on mute, the system may take several seconds to evaluate that audio input, determine that the user is intending to speak in the session, and unmute the user. In this scenario, the first few seconds of speech might thereby not be heard by others in the communication session. Accordingly, to address this issue, this disclosure includes a feature of buffering the received audio while the system evaluates the audio and/or other data when making determinations regarding whether to mute or unmute the user.

The system, in one example, could maintain a buffer of five seconds of audio (or any period of time) while it performs an analysis on the received audio. Any timeframe can be utilized. Thus, the system, as it receives and evaluates audio, would buffer the audio and in parallel identify whether the audio is speech from the user and intended for the conference. If so, the system can unmute the communication device of the user, and play out the buffered audio such that other participants in the call can hear the first few seconds of what is stated by the user. The system could even play out the buffered audio at an accelerated pace such that when the buffered part has been played and no more data is buffered such that the buffered audio and the live speech spoken by the user are synchronized, no more buffering occurs and no more audio is played out. In one aspect, the system may mute the audio speaker of the user's device during this time, so that they do not hear their own accelerated speech being played from the buffer. Other users may then hear a few seconds of accelerated speech from the user which is played out from the buffer and then hear live speech as the buffered portion and the live speech become synchronized. The system may evaluate the received speech and determine whether pauses are made within the speech or whether the user is speaking quickly, so as to coordinate the combination of playing out buffered speech and at what speed and when to cause the user not to hear the audio from the conference during the play out of buffered speech. The buffered speech could also be played out based on the system determining that others in a communication session are not speaking and thus there is an opening for the buffered speech to actually be heard.

An example shall make the point of this process. Assume that the user was on mute but then started speaking the following phrase "I think that <pause1> for the next year's budget we should consider <pause2> doubling our expenditures." The system could begin the process the audio and after processing the phrase "I think that", the system may determine that the user is speaking to the conference and determine to unmute the user. The system has buffered this phrase and the additional language "for the next year's . . . " as well. The system can unmute the user in the sense that the system begins to play out at an accelerated rate "I think that . . . " from the buffer. Depending on the timing of where the user is actually speaking and what other additional language is buffered, the system could continue to play out from the buffer the next portion of the phrase: "for the next year's budget we should consider . . . ". In this state, while in one aspect, the user might be un-muted, and another aspect, the user is still muted during this time in that what others are hearing is audio from the buffer rather than live speech from the user. During this time, the audio speakers associated with the device of the speaking user might be silenced such that the user will not be confused by hearing the buffered audio. The system can also filter out the user's speech but still provide audio from other conference participants to the speaking user. In one aspect, given the length of pauses and the structure of the speech, the buffered speech might be played out in real time if there is enough silence or pause in the overall phrases. Next, the system can determine, based on the timing of pause2, that real-time speech can be communicated into the conference. In this scenario, the user is now un-muted and the conference participants and the user can hear live speech from the user. Additionally, the speaking user can also now hear others in the conference as the issue of their hearing their own buffered speech no longer applies. In other words, when the user is finally providing live speech to the conference, any muting or filtering of their own voice from the audio speaker on their own device ceases.

FIG. 6 illustrates the basic steps of this process. The method includes receiving audio (602), buffering the audio to yield buffered audio (604), and analyzing the audio to determine whether the audio represent speech intended for a conference call (606). When the speech is intended for the conference call, playing the buffered audio in the conference call (608), and linking the user speaking the audio to the conference call after playing the buffered audio (610). Linking can mean establishing a normal full communication between the user device and the conference session. When the system no longer suppresses the audio speaker on the user's device and or mutes of the voice of the speaker to the conference in whole or in part, the system can be deemed to have linked the user back fully into the conference session.

As noted above, playing the buffered audio can be at a real-time pace or an accelerated pace and even can include an initial accelerated pace and a tapering off of the accelerated pace until the buffered audio is synchronized with live speech from the user. The concepts can also include control over the timing of the conference participants hearing the speaking user live as well as what the speaking user hears from the conference call based on whether audio that is buffered is being played, whether the buffered audio is synchronized with the speaking user, and so forth. Utilizing this approach, users can begin speaking as part of a conference call, even when they are on mute, and the first few seconds of their speech can be efficiently and naturally heard by members of the conference call. This approach can also apply to video conference calls in which video is buffered and played out from the buffer using the same principles set forth above. Furthermore, any other modality used to communicate can also apply to this buffering approach.

This disclosure includes the concept of evaluating such background noises to determine whether the user is participating in the conference call, or whether the noises only represent background noises. Where the noises are background noises, the system can automatically mute the user to prevent others in the call, or in the communication from seeing or hearing the background data. However, in some instances, the system may erroneously identify speech of the user as a background noise, and may automatically mute the user. In order to deal with a potential scenario of a miscalculation of the audio, the system could buffer all or a portion of the received audio and after automatically muting the user, the system could continue to evaluate the audio to determine whether the muting decision was correct.

In one scenario, assume that the user sneezes and then starts talking. The system might identify the sneeze as non-speech and automatically mute that user. In this scenario, the system could then have muted some of the speech of the user which was intended for the conference. However, if the system, upon making a mute decision, buffers the audio that it receives, the system can continue to evaluate whether if, after the sneeze, the system evaluates the speech of the user, the system can identify that the user should be un-muted, and the speech could be played to the conference call in the manner described above in real time or accelerated fashion. In a variation on this approach, the system could also evaluate the received audio and edit the speech, such that the clear non-speech component (the sneeze) is edited out and only the speech is presented from the buffer. Similar aspects are also potentially applied as well with respect to cutting off the audio speakers associated with the user device or muting the speaker while playing out buffered audio such that the speaking user is not confused over the adjustments. These control mechanisms are put in place, such that the speaking user does not notice that such corrections are being made, but they can simply speak and participate in the conference.

In another aspect, the system to provide notice to the user regarding the operation of playing out buffered audio. A light, a beep, a pitch, an icon, a haptic movement, or any other kind of notification can be provided to the user that this operation of playing out buffered audio is currently being performed, which can indicate to the user to slow down their speech, pause, or make some other corrective action. In one aspect, for example, a red light could be presented on the phone which indicates that buffered speech is being played out. The user could pause their speech and wait until a green light is presented at which point they simply continue with their thought because the buffered played out speech is now synchronized with live speech.

The overall approach disclosed herein is to determine whether a user it is participating in a communication session (video, audio, or other modality) is currently intending to communicate with the communication session. Thus, all the machine learning algorithms, classifiers, training data, and so forth can utilize characteristics of one or more of audio, characteristics of posture, gaze, motion, volume of audio, stance, sitting/standing status, speaking cadence, speaking direction, existence of other people in a room with the user, time of day, historical data related to the user's participation in the current communication session or previous communication sessions, computer interactions and so forth to evaluate and make a determination or a classification decision regarding whether at a given moment the user is intending to communicate with the communication session or not. Based on the classification decisions or this determination, the system can automatically mute, unmute, and/or buffer data associated with the user (audio, video, other data). The system can also record data associated with the user, such as motion detection, gaze direction, volume of speech, and so forth. The system can then also block the audio speakers of the user, play out buffered data at a real time, accelerated, or dynamically changing pace, and coordinate the ability of participants in the communication session to hear or see all of the intended input of the user.

In yet another aspect, the implementation of an action by the system is disclosed herein can be more granular than merely turning on or off a mute feature. For example, the system could be implemented to partially mute a user and the level of granularity can be determined based on the classification decision of what the noise is. The granularity can also relate to a filtering of certain sound frequencies. For example, if the classification determination can identify that the background noise heard in the communication session is a user typing on their keyboard, rather than a full-blown mute feature being turned on, a keyboard filter can be applied to the audio from that user such that the keyboard sound can be muted, but not other sounds which might be in the range of speech. Some sounds which are heard in a communication session or high-pitched and can come from moving papers or blinds, and so forth. These could also be filtered by the system, based on the determination or classification of those background sounds. A machine learning model can be developed for the environment around the device the user is using. The model can be applied separately for each background environment of each respective participant in the conference session. As participants access a conference session using their devices, the system can identify the calling number or accessing device for the session and retrieve the associated machine learning model (for background noise, user speaking patterns, etc.), and apply those machine learning models to making mute/unmute/alert and other related decisions.

In one aspect, the system may identify that the user is speaking but the confidence in the classification might be low that the user is speaking with an intent to communicate with others in the communication session. The system may partially mute the user such that it becomes harder for other users to hear the speaking user anticipating that if the user speaks louder and is intending to participate in the conference, that other participants will be able to hear the louder speech. In yet another aspect, the level of muting or unmute in of a particular user might not be an instantly on or instantly off approach. Depending on the classification decision of what the sound is or an intent of the user is with respect to the sound, the system may gradually mute or gradually unmute the user. Some of these decisions can depend on a confidence level or probability of correctness of a classification decision or a trend associated with multiple classifications and multiple confidence levels over time. Thresholds can be set at each stage to determine whether the system will partially mute, gradually mute, or fully mute/unmute a particular user. Any discussion herein, or any factors described herein with respect to making a mute or unmute decision can also be utilized to make a decision to partially mute or gradually mute/unmute the user. Furthermore, any mute/unmute decision or the factors used to make such a decision can also apply to determine what kind of sound filter to implement for a device associated with the user. Thus, muting or unmuting can be performed partially, in a timed manner, in a filtered manner, or fully based on a confidence level in the determinations disclosed herein or other data about background noise or speaker position or orientation, or any other parameters disclosed herein.

In yet another aspect, the system could also provide speech enhancement capabilities. In some scenarios, one user might be on a speakerphone, another user might be using a headset, or other microphone or input scenarios. The signal from some users might be strong and easily heard, while signals from other users might be more distant or difficult to hear. The system in this regard can utilize a classification determination to identify that some users are intending to participate in a communication session but might have a circumstance where their sound is more difficult to hear than others in the communication session. Thus, one aspect of this disclosure could include increasing the volume of one or more participants in the communication session based on a classification decision that their speech is intended for the communication session but has a lower volume or is more difficult to hear.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc., that perform particular tasks or implement particular abstract data types. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any data processing system that utilizes parameters for evaluating data input to generate output. While typical ASR magic tuning parameters are the example mainly discussed above, the disclosure covers other concepts as well, especially those that the future ASR technique might develop. The disclosure also covers any audio labelling task like natural language understanding (directly) on audio. In another aspect, the disclosure extends beyond automatic speech recognition and audio labeling to any other machine learning task which requires tuning system parameters on development sets. In this regards, automatic speech recognition would just be an example task.

Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
   establishing, via a network-based communication server, a communication conference between at least a first user having a first device and a second user having a second device;
   setting a mute feature for the first device associated with the first user such that the mute feature is on;
   detecting, via the network-based communication server and while the first device has the mute feature set, whether the first user is speaking and whether, based on data from one or more of a voice detection module, a facial recognition module, a head orientation detection module, a gaze detection module, a background noise module, a motion detection module, an audio volume module or a speaker identification module, the first user intends to communicate with the second user in the communication conference, to yield a determination; and
   when the determination indicates that the first user is speaking and the determination indicates that the first user intends to speak to the second user in the communication conference, automatically setting, via the network-based communication server, the mute feature to off for the first device to enable the second user to hear the first user in the communication conference.

2. The method of claim 1, wherein the step of detecting whether the first user is speaking further comprises determining an identification of the first user.

3. The method of claim 1, wherein detecting whether the first user is speaking further comprises using a voice activation detection module which also determines whether the speaking by the first user is intended for the communication conference.

4. The method of claim 1, wherein detecting whether the first user is speaking further comprises distinguishing between speech from the first user and a background noise.

5. The method of claim 1, wherein detecting whether the first user is speaking is based at least in part on facial orientation.

6. A method comprising:
   establishing, via a network-based communication server, a communication conference between at least a first user having a first device and a second user having a second device;
   setting a mute feature for the first device associated with the first user such that the mute feature is off;
   detecting, via the network-based communication server, while the first device has the mute feature off and based at least in part on a facial orientation, whether background noise exists in the communication conference at a predetermined threshold to yield a determination; and
   when the determination indicates that the background noise exists at the predetermined threshold, automatically setting, via the network-based communication server, the mute feature to on for the first device to prevent the second user from hearing sounds from the first device in the communication conference.

7. The method of claim 6, wherein the sounds comprise the background noise and wherein automatically setting the mute feature to on to prevent the second user from hearing sounds from the first device in the communication conference further comprises initiating a filter associated with the background noise.

8. The method of claim 6, wherein the step of detecting whether the background noise exists in the communication conference at the predetermined threshold is performed on one of the first device and a network-based server.

9. The method of claim 6, wherein the step of detecting whether the background noise exists in the communication conference at the predetermined threshold further comprises applying a machine learning model to an environment of the first device.

10. The method of claim 6, wherein the step of detecting whether the background noise exists in the communication conference at the predetermined threshold further comprises distinguishing between speech from the first user and the background noise.

11. A network-based conferencing system comprising:
    a processor; and
    a computer-readable storage medium having instructions stored which, when executed by the processor, cause the processor to perform operations comprising:
      establishing a communication conference between at least a first user having a first device and a second user having a second device;
      setting a mute feature on the first device associated with the first user such that the mute feature is on;
      detecting, while the first device has the mute feature set, whether the first user is speaking and whether, based on data from one or more of a voice detection module, a facial recognition module, a head orientation detection module, a gaze detection module, a background noise module, a motion detection module, an audio volume module or a speaker identification module, the first user intends to communicate with the second user in the communication conference, to yield a determination; and
      when the determination indicates that the first user is speaking and the determination indicates that the first user intends to speak to the second user in the communication conference, automatically setting the mute feature to off to enable the second user to hear the first user in the communication conference.

12. The network-based conferencing system of claim 11, wherein the step of detecting whether the first user is speaking is performed on one or more of the first device and a network-based server.

13. The network-based conferencing system of claim 11, wherein detecting whether the first user is speaking further comprises using a voice activation detection module.

14. The network-based conferencing system of claim 11, wherein detecting whether the first user is speaking further comprises distinguishing between speech from the first user and a background noise.

15. The network-based conferencing system of claim 11, wherein detecting whether the first user is speaking is based at least in part on one or more of facial recognition data, gaze detection data, background noise, motion detection, and audio volume data.

16. The network-based conferencing system of claim 11, wherein automatically setting the mute feature to off to enable the second user to hear the first user in the communication conference further comprises partially, in a timed manner or fully setting the mute feature to off.

17. The network-based conferencing system of claim 16, wherein automatically setting the mute feature to off to enable the second user to hear the first user in the communication conference partially, in the timed manner or fully setting the mute feature to off is based on a confidence level associated with the determination.

* * * * *